Dec. 12, 1939.  G. CLAUSING  2,183,134
COPYING LATHE
Filed July 30, 1938  2 Sheets-Sheet 1

INVENTOR.
George Clausing
BY
Pennie Davis Marvin + Edmonds
ATTORNEYS.

Dec. 12, 1939.	G. CLAUSING	2,183,134
COPYING LATHE
Filed July 30, 1938	2 Sheets-Sheet 2

INVENTOR.
George Clausing
BY
Pennie Davis Marvin & Edmonds
ATTORNEYS.

Patented Dec. 12, 1939

2,183,134

UNITED STATES PATENT OFFICE 2,183,134

COPYING LATHE

George Clausing, Portsmouth, Ohio, assignor to Vulcan Corporation

Application July 30, 1938, Serial No. 222,079

8 Claims. (Cl. 142—15)

This invention relates to copying lathes such as are employed in the reproduction of three dimensional objects from a model.

There are copying lathes of many types in use today, each being particularly adapted for the production of specific articles, such as gun stocks, hat blocks and the like. The principles of the present invention may be applied generally to copying lathes, irrespective of their particular capability. The invention may also be applied to pattern grading devices for producing two dimensional objects. As an example of the application of the invention, it will be described in connection with a copying lathe, such as that used in the shoe industry for producing shoe lasts. The practice of the invention is particularly valuable in this branch of the shoe art, inasmuch as the tolerances in dimensions permitted by the shoe manufacturer are very small and the present invention is designed to increase the accuracy and smoothness of operation of the lathe.

In a commonly used type of last lathe, a master form or model is rotated and during such rotation is held in engagement with a follower or model wheel, which during the operation of the machine, is traversed longitudinally of the model. The motion resulting therefrom generated by the contours of the model passing over the model wheel, is transmitted to a work piece which is rotated at a speed synchronized with that of the model. The work piece engages a driven cutter which removes the outer portion thereof and gives to the remaining portion the exact shape of the model or some regulated counterpart thereof, which may exhibit, for instance, a required size or width change, as compared to that of the model.

A lathe of this type employs two moving elements which usually takes the form of carriages moving along straight ways. The carriages respectively support the model wheel and the driven cutter. The ways are arranged to guide the carriages carrying the model wheel and cutter in parallel alignment with each other and with the axis about which the model and work piece are rotated.

The carriages are independently movable, save for their connection to a common pantographic mechanism, by means of which they are driven along the ways and by means of which they are given a predetermined speed ratio to effect a required size or other change in the last produced as compared to the model.

It has been found in this type of lathe that a suitable mode of operation is to permit the carriages to rest by gravity upon the ways. This construction permits the necessary freedom of motion to insure a degree of smoothness of operation and accuracy comparable with the best results obtainable before the conception of the present invention.

The present invention accomplishes many vital improvements in the operation of the lathe and at no sacrifice to the efficiency of any of the accepted and highly regarded principles of its operation. The invention in its broadest aspect concerns a stabilizing mechanism connected between the carriages, which acts at all times to rigidly resist displacement of the carriages from their parallel alignment and which at the same time freely permits true linear parallel motion of one carriage with respect to the other. The stabilizing mechanism may desirably consist of a rigid torsion member rotatably mounted upon one of the carriages with its axis disposed transversely of the ways and provided with two or more spaced rigid arms upon which are pivoted a corresponding number of links or struts, the outer ends of which are pivotally connected to the other carriage.

In the operation of the lathe, a subject which will be amplified hereinafter, the carriages are fed along the ways and in such instances wherein the pantographic feeding means are adjusted to enlarge, reduce or otherwise modify the produced last, the carriages are given a differential speed during their travel along the ways. In such event, the torsion member rotates as the distance between the carriages increases or decreases. It will be clear from the above, that the normal operation of the lathe is not interfered with in any way by the practice of the invention.

Lathes now in common use fail to include in their construction, a device specifically designed to stabilize the carriages, the stability of the carriages depending solely upon the pressure of their own weight upon the ways. As will be set forth more fully hereinafter, a lathe when in operation, develops vibration and other positive forces, which act to displace the carriages from their accurate alignment. These forces develop sufficient intensity to displace the carriages from their true course along the ways with consequent degradation of the quality of the product and in extreme cases, the work may be so defective as to require that it be discarded. When, however, the lathe has incorporated in its structure a stabilizing means embodying the principles of the present invention, such waste of material is prevented. A tendency of the carriages to shift out of alignment with respect to each other is overcome by the stabilizing device. The arms and their connecting links upon the torsion member of the stabilizing device transmit the disturbing forces to the torsion member where they are entirely absorbed and prevented from causing mis-alignment of the carriages. The carriages are thus rigidly held in parallel alignment against all forces tending to distort the necessary perfect alignment therebetween.

To accurately and more completely describe the invention, a selected embodiment thereof will be described in connection with the accompanying drawings in which—

Figure 1:
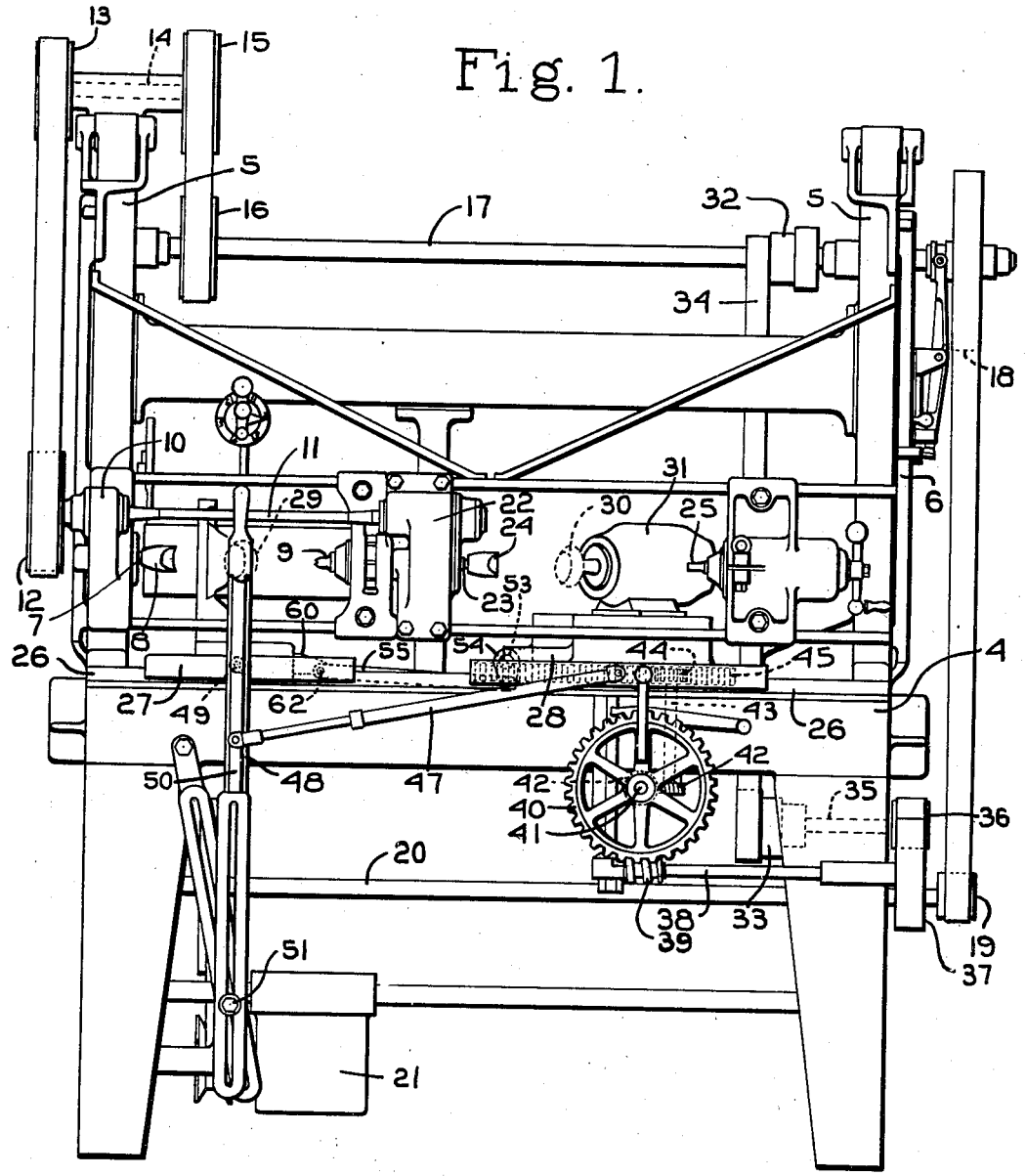
Fig. 1 is a front elevation of a lathe embodying the invention.
Figure 2:
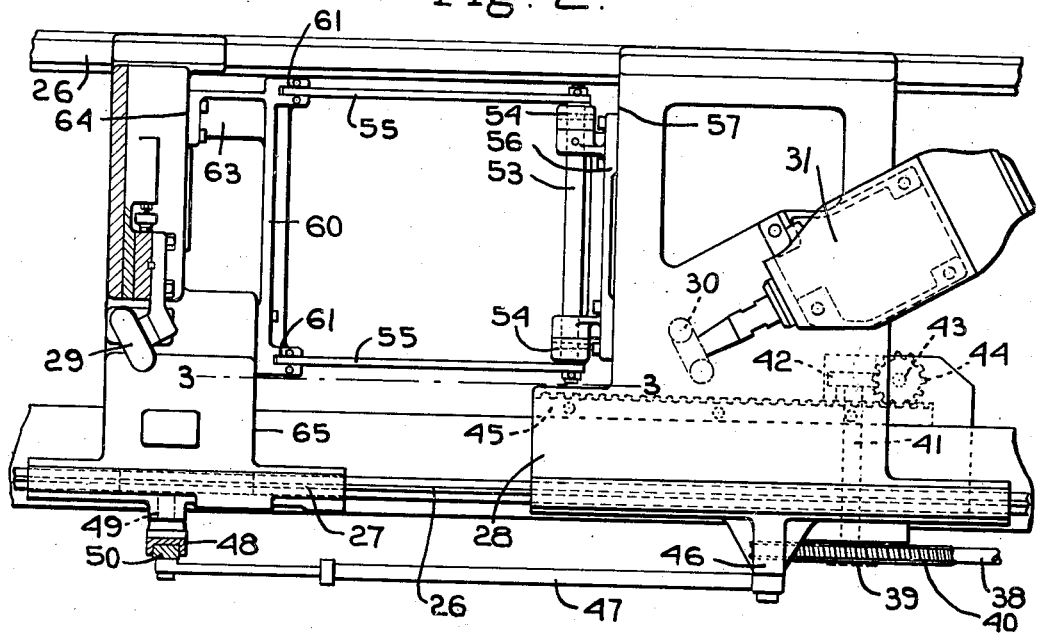
Fig. 2 is a top plan view of the lathe carriages and a portion of the lathe base.
Figure 3:
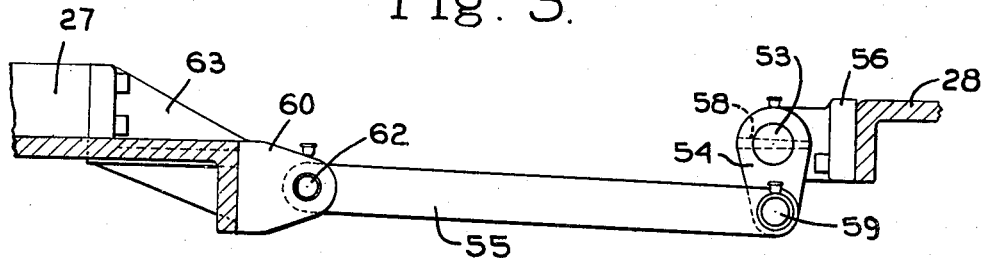
Fig. 3 is a cross section on line 3—3, Fig. 2.

The invention is applied herein to a copying lathe of the type used in the shoe industry for turning shoe lasts, but may, however, readily be applied to other types of machines, as above suggested. The lathe illustrated has a body or frame 4 from the opposite ends of which extend upwardly a pair of supports 5 from the upper ends of which a swing frame 6 is pivotally supported. The lower portion of the swing frame has journaled therein a driven spindle 7 upon the inner end of which a heel dog 8 is secured. In axial alignment with the dog 8, a toe dog 9 is supported in the swing frame 6. A model last not shown is received between the dogs 8 and 9 and is rotated during the operation of the lathe by the driven spindle 7. The spindle 7 is or may be driven in the usual manner as by means of a gear train within the housing 10. The gear train is in turn driven by the shaft 11 journaled in the swing frame. The shaft 11 is driven by a pulley 12 which is belt driven from a pulley 13 on a short shaft 14 journaled adjacent the pivot of the swing frame upon the upright 5. The other end of the shaft 14 has secured thereon a pulley 15 which in turn is belt driven from a pulley 16 on a shaft 17 journaled in the upright 5 of the lathe frame. The shaft 17 has a pulley 18 thereon which is belt driven from a pulley 19 upon a power shaft 20 journaled in the frame 4 of the lathe and driven in any suitable manner as by means of a motor 21.

The shaft 11 drives a second gear train enclosed in the casing 22. The driven gear of this gear train rotates a shaft 23 upon the outer end of which is secured a heel dog 24. In axial alignment with the dog 24 is mounted a toe dog 25. A block or work piece not shown is held and rotated between the dogs 24 and 25. The frame 4 of the lathe is provided with ways 26 extending parallel to the axes of the shafts 7 and 23. Upon the ways 26 a pair of carriages 27 and 28 travel in tandem relation. The carriage 27 is provided with a follower or model wheel 29 which engages the model as the model rotates between the dogs 8 and 9. As the model rotates, the swing frame 6 oscillates forward and backward, when viewing the lathe from the front, as the model wheel follows the contours of the model.

The carriage 28 is provided with a driven cutter 30 which may desirably be directly connected to a motor 31. The function of the cutter is to cut contours upon the block corresponding to those of the model as the block is rotated synchronously with that of the model. During the cutting operation, the two carriages are fed lengthwise and thereby cause the cutter to follow a spiral path along the block which motion combined with the motion of the swing frame reproduces the model within the limits of the block.

Any suitable feed mechanism may be employed to drive the carriages. The desirable form of drive is that shown in the drawings. The shaft 17 has mounted thereon a pulley 32 which transmits power to a pulley 33 by means of a belt 34. The pulleys 32 and 33 may be of the multiple step type, by means of which the driving ratio between the two pulleys may be changed by shifting the belt to that step which produces the proper speed. The pulley 33 is mounted upon a shaft 35 journaled in the frame 4 of the lathe. The outer end of the step 35 has mounted thereon a pulley 36 which in turn transmits power to the pulley 37 fixed upon a shaft 38. The shaft 38 is journaled in the frame and has secured upon its inner end a worm 39 which engages and drives a worm gear 40. The worm gear 40 is mounted upon a transverse shaft 41 journaled in the frame of the lathe. The shaft 41 has secured upon its inner end one of a pair of spiral gears 42. The other one of the pair is mounted upon the lower end of a vertical shaft 43, upon the upper end of which is secured a pinion gear 44. The pinion gear 44 meshes with a rack 45 secured upon the carriage 28. The shafts 41 and 43 are journaled in a fixed part of the lathe frame. Therefore, the rotation of the gear 44 by reason of its engagement with the rack 45, moves the carriage 28 along the ways 26.

The carriage 28 is provided with a forwardly projecting boss 46 upon the outer end of which is pivoted a link 47 which in turn is pivotally connected at its other end to a pantograph lever 48, which in turn is pivotally connected to the carriage 27 at 49. The pivotal connection between the link 47 and the pantographic lever 48 is located upon a bar 50 which is adjustable lengthwise along the lever 48. The lever 48 is fulcrumed adjacent its lower end at 51. This fulcrum 51 is adjustable to effect a change in the length of the arm of the lever 48 extending from the fulcrum to the pivot point 49 upon the carriage 27. A further adjustment for effecting a desired pantographic relation between the respective feeds of the two carriages is obtained by adjusting the bar 50 along the lever 48. By so doing, the pivotal connection 52 between the link 47 and the bar 50 can be raised above or lowered beneath the pivot 49 between the carriage 27 and the lever 48. The carriage 27 is thus driven along the ways from the carriage 28 through the medium of the links 47 and the lever 48. By placing the pivot 52 in axial alignment with the pivot 49, the carriage 27 is driven at the same speed as that of the carriage 28. However, when the pivot 52 is placed above or below the pivot 49, the velocity of the two carriages then becomes proportional to the length of the elements of the lever 48. Such adjustability is provided to permit the last maker to produce a plurality of lasts of various sizes from a master or model last.

The foregoing detailed description relates to well known and commonly employed elements in a copying lathe of typical construction and this matter of itself does not constitute a part of the present invention.

The carriage stabilizing device upon which the principles of the invention are based will now be described. The principal functional element of the stabilizing device consists of a relatively heavy and inflexible torsion member 53 having a plurality of arms 54 rigidly secured thereto preferably near the ends thereof. Upon the outer ends of the arms are pivotally secured a pair of rigid links 55.

The torsion member 53 may be of any suitable construction having the necessary rigidity to resist relatively large torsional forces. As illustrated in the drawings, the torsion member 53 has the form of a rigid inflexible shaft rotatably mounted upon one of the carriages, as for example, the carriage 28. To insure the highest efficiency of the device, the shaft 53 must be accurately journaled and have no lateral play in its bearings. For most effective results, the shaft 53 should also be accurately aligned at 90° to the ways 26. An effective method of insuring the necessary degree of accuracy in installing the shaft 53 is to journal the shaft in a supporting bracket 56. The bracket may be suitably designed for mounting upon the particular lathe to which the stabilizer is applied. In the lathe construction illustrated, the carriage 28 has a flat inner face 57 against which the bracket 56 is securely bolted. The necessary truing of the alignment of the axis of the shaft at right angles to the ways may readily be accomplished by shimming under the ends of the brackets or an alternative procedure is to finish the face 57 at right angles to the ways as by milling or other machine operation.

The arms 54 are rigidly connected to the shaft 53 in any suitable manner as by means of the pins 58. The outer ends of the arms 54 are provided with stud shafts 59 to which are accurately journaled one end of the links 55. The other end of the links 55 are pivoted in alignment upon an axis parallel to the axis of the shaft 53 upon the carriage 27. A convenient method of accurately establishing the correct position of these pivot points is to provide a bracket or frame 60 having slots 61 within which the ends of the links are received. The ends of the links are provided with apertures within which are nicely fitted the studs 62 which constitute the pivotal connection.

The frame 60 is designed to be readily received upon the particular lathe to which the stabilizing means is applied. As illustrated herein, the bracket 61 is provided with a leg 63 which supports one end thereof from the face 64 on the carriage, while the other end thereof is secured to the face 65. The invention is not, however, confined to the specific structure of the brackets. They are designed merely to produce the most effective operating results in connection with the carriages to which they are applied. By employing a construction including the brackets 61 and 56, the bearing and other parts of the stabilizing member may be carefully and accurately fitted before it is assembled upon the lathe carriages, thus enabling the device to be made smooth-running and free from looseness and lost motion between its moving parts.

When the carriages 27 and 28 are in their mid-position, for example, approximately half way between the heel and toe of the last, the arms 54 are then preferably substantially in a vertical position. However, it is not essential to the successful operation of the device that such adjustment be followed closely. The arms must, however, be so positioned that during the traverse of the carriages, the axis of the pivot stud 62 which connects the link 55 to the arm, will never assume a dead center position between the axis of the shaft 53 and the axes of the pivot studs 62.

To better understand the operation of the stabilizing device, it may be advisable to discuss some of the forces acting upon the carriages during the turning of a last. Considering first the carriage 28, its motivating force is applied at the pitch line of the rack 45 by the pinion gear 44, as above described. This motion is opposed by friction between the moving surfaces of the carriages and the ways but chiefly by the pressure of the cut at the point of engagement between the cutter 30 and the work piece. The complex direct and reactive forces thus set up by the cutting operation tend to shift the carriage out of a true course along the ways. When an excessively heavy cut is taken as when a small last is turned from a relatively large block, these forces become greatly intensified causing the stability of the carriage to be partially or wholly overcome. Simultaneously with the forces resulting from the feed of the carriages, there is unavoidably present a relatively high degree of vibration due to the high speed and power of the driven cutter. Such vibration enhances the tendency of the carriages to shift out of their true linear path.

Considering now the forces acting on the carriage 27, it is common practice to locate the carriage connecting elements, i. e., the link 47 and the lever 48, at the front of the lathe. The sole force acting to feed the carriage 27, therefore, acts at a position relatively remote from the point of contact between the model wheel 29 and the model. There is, therefore, an unbalanced component force resulting from the driving pressure of the link 47 and the resistance offered by the carriage due to friction and the drag of the model wheel along the model, especially while the wheel is riding on a steeply sloping portion of the model. This unbalanced force tends directly to shift the carriage out of its proper course parallel to the course of the carriage 28. The vibrational forces described in connection with the carriage 28 are also present and contribute to the tendency of the carriage 27 to depart from its proper course.

It is obvious that if these forces are permitted to actually move the carriages, the product resulting from a lathe of this construction is rough and inaccurately shaped. The quality of the product depends largely on the accuracy and smooth running character of the lathe. Obviously if the distance between the point of contact of the model wheel with the model and the point of contact of the cutter and block is permitted to vary in any manner departing from the intended course of these elements, such course being determined by the ways 26 and the pantographic grading means, a defective product will result.

Having observed at least some of the conditions which occur during the turning of a last and their effect upon the quality of the product, it will now be pointed out how the disturbing conditions are overcome by the stabilizing means. The construction of the stabilizing means permits the carriages to approach each other or separate in a truly straight parallel path. When such relative motion takes place, the torsion member 53 freely rotates about its axis, such rotation being induced by the links 55 and the arms 54. When, however, there arises a tendency of the carriages to depart from a true course, forces are set up within the stabilizer which are absorbed by the torsion member and fail to produce any measurable resultant motion of the carriages from their intended course along the ways.

A better understanding of the action of the stabilizer may be gained by assuming a specific set of conditions. For example, let it be assumed that the result of the forces acting upon the carriages produces a force which is greater at the front portion of the carriage, tending to separate the carriages, than a similar or oppositely acting force at the back or rear portion of the carriages. This combination of forces if allowed to act, would tend to twist the carriages out of their proper position upon the ways. Under these conditons, the force acting at the front portion of the carriages is received by the link 55 and transmitted through the arm 54 to the torsion member 53. This force thus tends to rotate the torsion member which in turn transmits the force through the other arm 54 to the rear link 55. This unbalanced disturbing force is thus neutralized. In the same manner, any unbalanced force originating at the rear-most link 55 is absorbed in the torsion member and the forward link 55. Since there is no looseness or lost motion between the elements of the stabilizing means, there can be no resultant undesired motion of the carriages which are thereby held rigidly in a straight and true path along the ways. A similar action takes place when disturbing forces are applied to the carriage 27 or to both carriages simultaneously.

The following feature also contributes to the high operating efficiency of the invention, particularly when used in connection with the above described type of copying lathe. It will be observed from the foregoing description that when an unbalanced combination of forces is applied to the carriages, the stabilizing means act to neutralize the disturbing elements and convert a resulting force if present into a balanced force acting to cause the carriages to separate or approach each other. This force cannot, however, be translated into motion because the two carriages are connected together by a link 47 and the lever 48. The force is, therefore, instantly absorbed before any undesired movement can take place between the carriages. The stabilizer, therefore, not only functions in itself to render the carriages stable, but also constitutes an inter-locking element with certain other elements of the lathe to still further increase its effectiveness.

I claim:

1. In a last lathe a frame, means for holding and manipulating the model and last, a model wheel carriage having a model wheel, a cutter carriage having a driven cutter, straight ways on said frame on which said carriages travel in constantly parallel alignment, means for moving the carriages along the ways at different speeds, and linkage connecting said carriages and operable to permit relative linear motion therebetween and to lock the carriages against displacement from their parallel alignment on said ways.

2. In a last lathe a frame, means for holding and manipulating the model and last, a model wheel carriage having a model wheel, a cutter carriage having a driven cutter, straight ways on said frame on which said carriages travel in constantly parallel alignment, carriage feeding means applying its propelling force at a single position on said carriages, means connected between said carriages acting to cause them to move at different speeds, a rigid member pivoted on one of said carriages, a plurality of links connected between the other carriage and said rigid member and operable to permit relative linear motion therebetween and to lock the carriages against displacement from their parallel alignment on said ways.

3. In a last lathe, a frame, means for holding and manipulating the model and last, a model wheel carriage having a model wheel, a cutter carriage having a driven cutter, straight ways upon said frame upon which said carriages travel in tandem relation in constantly parallel alignment, means for feeding the carriages at different speeds, carriage stabilizing means having at least two laterally spaced controlling members connected between said carriages and a rigid member pivoted on one of said carriages and coacting with said controlling members to confine the relative movement between the carriages to linear movement having equal increments at all points between the carriages.

4. In a copying lathe a frame, means for holding and manipulating a model and workpiece, a model carriage having a model wheel, a cutter carriage having a driven cutter, straight ways in the frame upon which the carriages travel in constantly parallel alignment, means for moving said carriages along said ways at different speeds, a plurality of extensible and contractible carriage controlling elements spaced transversely of the ways and connected between the carriages, means for causing said controlling elements to extend or contract equally when the carriages have relative movement thereby preventing the carriages from becoming displaced from their parallel alignment on said ways.

5. In a last lathe a frame, means for holding and manipulating a model and a last, a model wheel carriage having a model wheel, a cutter carriage having a driven cutter, straight ways on said frame upon which said carriages travel in tandem relation in constantly parallel alignment, means for feeding said carriages along said ways at different speeds, and a stabilizing mechanism having a rigid rotatable torsion member mounted on one of said carriages and a plurality of spaced controlling members reaching between the carriages connected at one end to the torsion member and at their other end to the second carriage, said controlling elements acting through said torsion member to transmit equal increments of motion during the relative linear motion between the carriages and to resist the transmission of unequal increments of motion.

6. In a last lathe, a frame, means for holding and manipulating a model and last, a model wheel carriage having a model wheel, a cutter carriage having a driven cutter, straight ways upon which said carriages travel in constantly parallel alignment, means for driving said carriages along said ways at different relative speeds, a rigid torsion member pivoted on one of said carriages and a system of links extending between said carriages and co-acting with said torsion member to lock the carriages against displacement from their normal parallel alignment on said ways.

7. In a last lathe, a frame, means for holding and manipulating a model and last, a model wheel carriage having a model wheel, a cutter carriage having a driven cutter, straight ways upon said frame upon which said carriages travel in constantly parallel alignment in tandem relation, means for moving the carriages along the ways at different relative speeds, a rigid torsion member rotatably mounted on one of the carriages on an axis laterally disposed to the ways, a plurality of spaced link members connected at one of their ends to said torsion member and at their other ends to the other carriage, whereby when the carriages are caused to have relative motion, said torsion member is rotated to cause equal increments of motion to be distributed at each point of connection of said stabilizing members with said carriage, thereby preventing displacement of the carriages from their normal parallel alignment.

8. In a last lathe, a frame, means for holding and manipulating a model and last, a model wheel carriage having a model wheel, a cutter carriage having a driven cutter, straight ways on said frame upon which said carriages travel in tandem relation in constantly parallel alignment, means for moving said carriages along said ways at different speeds, a rigid shaft journaled on an axis substantially 90 deg. to said ways upon one of said carriages, a plurality of spaced rigid arms mounted on said shaft and a plurality of rigid links pivoted at one of their ends upon said arms and at their other end upon the other carriage, whereby the carriages are permitted to have relative linear motion and are locked against displacement from their normal parallel alignment on said ways.

GEORGE CLAUSING.